US012613048B2

(12) United States Patent
Vincensini et al.

(10) Patent No.: US 12,613,048 B2
(45) Date of Patent: Apr. 28, 2026

(54) REFRIGERATION SYSTEM

(71) Applicant: Carrier Corporation, Palm Beach Gardens, FL (US)

(72) Inventors: Camille Vincensini, Montluel (FR); Nicolas Fonte, Montluel (FR); Yvan Alquier, Montluel (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 493 days.

(21) Appl. No.: 17/125,079

(22) Filed: Dec. 17, 2020

(65) Prior Publication Data

US 2021/0239346 A1      Aug. 5, 2021

(30) Foreign Application Priority Data

Jan. 31, 2020    (EP) ..................................... 20275023

(51) Int. Cl.
| | |
|---|---|
| *F24F 11/49* | (2018.01) |
| *F24F 11/64* | (2018.01) |

(Continued)

(52) U.S. Cl.
CPC .............. *F24F 11/49* (2018.01); *F24F 11/64* (2018.01); *F24F 11/65* (2018.01); *F25B 41/33* (2021.01); *F25B 49/02* (2013.01); *G05B 13/026* (2013.01); *F24F 2110/10* (2018.01); *F24F 2110/12* (2018.01)

(58) Field of Classification Search
CPC .. F24F 11/49; F24F 11/64; F24F 11/65; F24F 2110/10; F24F 2110/12; F25B 41/33; F25B 49/02; F25B 2341/063; F25B 49/005; F25B 2500/07; F25B 2600/2513; F25B 2700/1931; F25B 2700/195; F25B 1/00; G05B 13/026

See application file for complete search history.

(56) References Cited

U.S. PATENT DOCUMENTS

| | | |
|---|---|---|
| 5,058,395 A | 10/1991 | Ni et al. |
| 6,170,277 B1 | 1/2001 | Porter et al. |

(Continued)

FOREIGN PATENT DOCUMENTS

| | | |
|---|---|---|
| CN | 209131090 U | 7/2019 |
| EP | 1452810 A1 | 9/2004 |

(Continued)

OTHER PUBLICATIONS

European Search Report for European Application No. 20275023.8, International Filing Date Jan. 31, 2020, Date of Mailing Jul. 23, 2020, 9 pages.

*Primary Examiner* — Tameem D Siddiquee
(74) *Attorney, Agent, or Firm* — CANTOR COLBURN LLP

(57) ABSTRACT

Refrigeration systems are described. The systems include a refrigeration circuit having a compression device, a heat rejecting heat exchanger, an expansion device, and a heat absorbing heat exchanger. The refrigeration systems include one or more sensors configured to measure a pressure associated with the heat rejecting heat exchanger, and a controller configured to compare the pressure measured by the one or more sensors to a predicted pressure, and to control the expansion device on the basis of the comparison.

19 Claims, 2 Drawing Sheets

(51) Int. Cl.

| | |
|---|---|
| *F24F 11/65* | (2018.01) |
| *F24F 110/10* | (2018.01) |
| *F24F 110/12* | (2018.01) |
| *F25B 41/33* | (2021.01) |
| *F25B 49/02* | (2006.01) |
| *G05B 13/02* | (2006.01) |

(56)     References Cited

U.S. PATENT DOCUMENTS

| | | | |
|---|---|---|---|
| 6,581,397 | B1 | 6/2003 | Taira et al. |
| 8,186,171 | B2 | 5/2012 | Heinbokel |
| 8,529,215 | B2 | 9/2013 | Heath et al. |
| 9,546,807 | B2 | 1/2017 | Goel et al. |
| 9,657,978 | B2 | 5/2017 | Kopko et al. |
| 10,107,535 | B2 | 10/2018 | Taras et al. |
| 2013/0111929 | A1* | 5/2013 | Jekimow ................. F25B 41/34 |
| | | | 62/56 |
| 2014/0020417 | A1* | 1/2014 | Perez ..................... F25B 41/34 |
| | | | 62/126 |
| 2015/0308723 | A1* | 10/2015 | de Larminat ......... F25B 31/002 |
| | | | 62/190 |
| 2017/0102174 | A1 | 4/2017 | Chen et al. |
| 2017/0234561 | A1* | 8/2017 | Lin .......................... F24F 11/85 |
| | | | 702/183 |
| 2017/0370627 | A1* | 12/2017 | Takenaka ................ F25B 13/00 |
| 2018/0372384 | A1 | 12/2018 | Taras et al. |
| 2019/0170415 | A1* | 6/2019 | Walser .................. F25B 49/005 |

FOREIGN PATENT DOCUMENTS

| | | |
|---|---|---|
| EP | 1559970 A2 | 8/2005 |
| JP | 2000234811 A | 8/2000 |
| JP | 6590768 B2 | 10/2019 |
| WO | 2014103520 A1 | 7/2014 |
| WO | 2014118945 A1 | 8/2014 |
| WO | 2014156313 A1 | 10/2014 |
| WO | 2018075398 A1 | 4/2018 |

* cited by examiner

US 12,613,048 B2

REFRIGERATION SYSTEM

CROSS-REFERENCE TO RELATED APPLICATIONS

This application claims priority to European Patent Application No. 20275023.8, filed Jan. 31, 2020, the contents of which are incorporated by reference herein in their entirety.

BACKGROUND

The present invention relates to refrigeration systems and methods of operating refrigeration systems.

Refrigeration or heating can be provided by a refrigeration system making use of the refrigeration cycle, in which a refrigerant fluid is compressed, cooled, expanded and then heated.

Where a refrigeration system is used for satisfying a cooling load, the cooling of the refrigerant fluid may be done via a heat rejecting heat exchanger rejecting heat to the atmosphere, and the heating of the refrigerant fluid may be done via a heat absorbing heat exchanger absorbing heat from an object to be cooled, such as a refrigerated space for low temperature storage, or an interior of a building. In this way the refrigeration system can transfer heat from within the refrigerated space or building to outside of the refrigerated space or building, even when the interior is cooler than the atmosphere.

Alternatively, a refrigeration system can be used as a heat pump to satisfy a heat demand. In this case, the heat absorbing heat exchanger may be used to absorb heat from a low temperature source, with the refrigeration circuit then rejecting heat to a higher temperature object that is to be heated. Once again this may be, for example, the interior of a building.

It is believed that there remains scope for improvements to refrigeration systems.

SUMMARY

According to some embodiments, refrigeration systems are provided. The refrigeration systems include a refrigeration circuit comprising a compression device, a heat rejecting heat exchanger, an expansion device, and a heat absorbing heat exchanger, one or more sensors configured to measure a pressure associated with the heat rejecting heat exchanger, and a controller configured to compare the pressure measured by the one or more sensors to a predicted pressure, and to control the expansion device on the basis of the comparison.

In addition to one or more of the features described herein, or as an alternative, further embodiments of the refrigeration systems may include that the controller is configured to continuously and/or periodically compare the measured pressure to the predicted pressure.

In addition to one or more of the features described herein, or as an alternative, further embodiments of the refrigeration systems may include that the controller is configured to continuously and/or periodically calculate the predicted pressure using one or more measured parameters.

In addition to one or more of the features described herein, or as an alternative, further embodiments of the refrigeration systems may include that the one or more measured parameters comprise: (i) an outdoor air temperature; (ii) a temperature associated with the heat absorbing heat exchanger; (iii) a capacity of the compression device; (iv) an area associated with the heat rejecting heat exchanger; (v) a pressure ratio associated with the refrigeration circuit; and/or (vi) a fan speed associated with the refrigeration circuit.

In addition to one or more of the features described herein, or as an alternative, further embodiments of the refrigeration systems may include that the predicted pressure is a maximum predicted pressure of a refrigerant fluid absent a slug flow phenomenon.

In addition to one or more of the features described herein, or as an alternative, further embodiments of the refrigeration systems may include that the expansion device comprises an expansion valve, and wherein the controller is configured to control a degree of opening of the expansion valve on the basis of the comparison.

In addition to one or more of the features described herein, or as an alternative, further embodiments of the refrigeration systems may include that the controller is configured to control the expansion device on the basis of the comparison by temporarily increasing the degree of opening of the expansion valve when the measured pressure is greater than or equal to the predicted pressure.

In addition to one or more of the features described herein, or as an alternative, further embodiments of the refrigeration systems may include that the controller is configured to temporarily increase the degree of opening of the expansion valve by a factor of around (i) ≥1.5; (ii) ≥2; (iii) ≥2.5; (iv) ≥3; (v) ≥3.5; or (vi) ≥4.

In addition to one or more of the features described herein, or as an alternative, further embodiments of the refrigeration systems may include that the controller is configured to temporarily increase the degree of opening of the expansion valve for a time period of around (i) 1-10 s; (ii) 10-20 s; (iii) 20-30 s; (iv) 30-40 s; (v) 40-50 s; (vi) 50-60 s; or (vii) >60 s.

According to some embodiments, methods of operating refrigeration systems that include a refrigeration circuit having a compression device, a heat rejecting heat exchanger, an expansion device, and a heat absorbing heat exchanger are provided. The methods include measuring a pressure associated with the heat rejecting heat exchanger, comparing the measured pressure to a predicted pressure, and controlling the expansion device on the basis of the comparison.

In addition to one or more of the features described herein, or as an alternative, further embodiments of the methods may include continuously and/or periodically measuring the pressure and continuously and/or periodically comparing the measured pressure to the predicted pressure.

In addition to one or more of the features described herein, or as an alternative, further embodiments of the methods may include continuously and/or periodically measuring one or more parameters and continuously and/or periodically calculating the predicted pressure based on the one or more parameters.

In addition to one or more of the features described herein, or as an alternative, further embodiments of the methods may include that the expansion device comprises an expansion valve, and wherein controlling the expansion device on the basis of the comparison comprises temporarily increasing a degree of opening of the expansion valve when the measured pressure is greater than or equal to the predicted pressure.

In addition to one or more of the features described herein, or as an alternative, further embodiments of the methods may include that controlling the expansion device on the basis of the comparison comprises temporarily increasing the degree of opening of the expansion valve from a first value to a second value when the measured pressure is greater than or equal to the predicted pressure, wherein the ratio of the second value to the first value is around (i) ≥1.5; (ii) ≥2; (iii) ≥2.5; (iv) ≥3; (v) ≥3.5; or (vi) ≥4.

In addition to one or more of the features described herein, or as an alternative, further embodiments of the methods may include that controlling the expansion device on the basis of the comparison comprises temporarily increasing the degree of opening of the expansion valve for a time period of around (i) 1-10 s; (ii) 10-20 s; (iii) 20-30 s; (iv) 30-40 s; (v) 40-50 s; (vi) 50-60 s; or (vii) >60 s.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1:
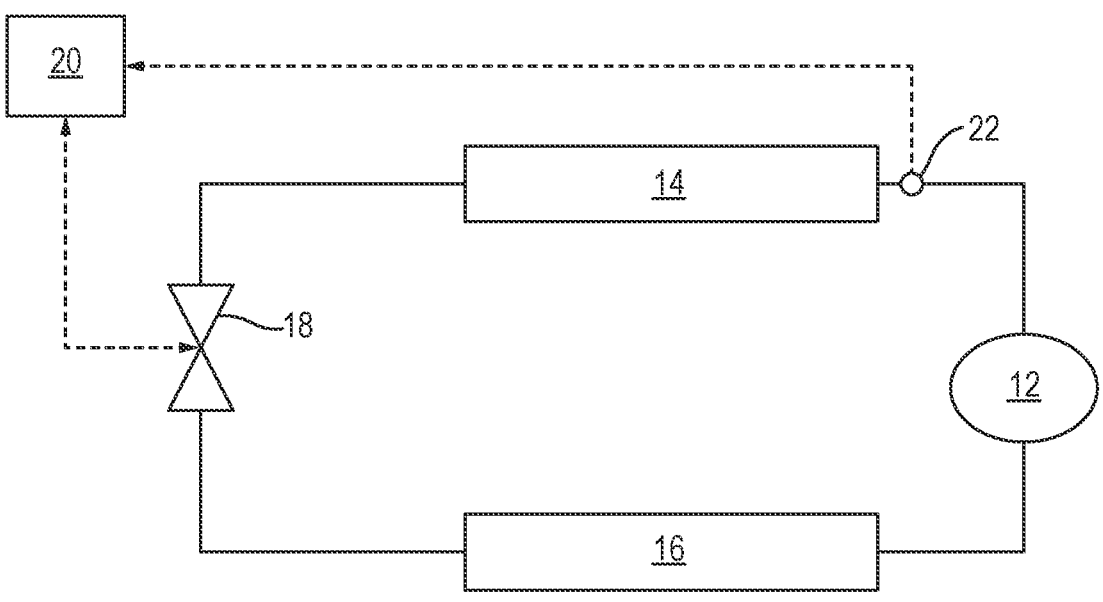
FIG. 1 is a schematic diagram for a refrigeration system in accordance with various embodiments.

As shown and described herein, various features of the disclosure will be presented. Various embodiments may have the same or similar features and thus the same or similar features may be labeled with the same reference numeral, but preceded by a different first number indicating the figure to which the feature is shown. Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

The present invention provides a refrigeration system having a refrigeration circuit comprising a compression device, a heat rejecting heat exchanger, an expansion device, and a heat absorbing heat exchanger, one or more sensors configured to measure a pressure associated with the heat rejecting heat exchanger, and a controller configured to compare the pressure measured by the one or more sensors to a predicted pressure, and to control the expansion device on the basis of the comparison.

Controlling the expansion device on the basis of a comparison between a measured pressure associated with the heat rejecting heat exchanger and a corresponding predicted pressure can improve the functioning of the refrigeration system, in particular by stabilizing operation of the refrigeration system, broadening the conditions under which the system can operate (that is, enlarging its operating envelope), and increasing the efficiency of the refrigeration system.

The Applicant has recognized that a liquid slug (or "slug flow") phenomenon (and similar instabilities) of refrigerant fluid within the (heat rejecting heat exchanger of the) refrigeration circuit can be responsible for destabilizing the refrigeration system, thereby reducing the conditions under which the system can reliably operate, and reducing its efficiency.

The Applicant has also recognized that the presence (or absence) of slug flow (or similar instabilities) within the (heat rejecting heat exchanger of the) refrigeration circuit can be detected by comparing a measured pressure to a corresponding predicted pressure. In particular, as will be described in more detail below, a maximum pressure within the heat rejecting heat exchanger absent the slug flow phenomenon (or similar instabilities) can be (and in various embodiments is) calculated based on various operating parameters of the refrigeration system (other than the measured pressure) that can be readily measured and/or determined. A measured pressure reaching or exceeding this predicted pressure can be indicative of the presence of slug flow (or similar instabilities).

The Applicant has furthermore recognized that the slug follow phenomenon (and similar instabilities) can be controlled (e.g. eliminated or reduced) by controlling the expansion device on the basis of the comparison. For example, when the slug follow phenomenon is detected (on the basis of the comparison), the expansion device can be controlled so to increase the flow rate of refrigerant through the refrigeration circuit, thereby flushing refrigerant from the heat rejecting heat exchanger and eliminating or reducing the slug follow phenomenon.

It will be appreciated, therefore, that the present disclosure provides an improved refrigeration system.

A refrigerant fluid may be provided within the refrigeration circuit. The refrigerant fluid may comprise any suitable refrigerant fluid, such as a two phase refrigerant having a mix of liquid and gas phases, such as for example R410A, R454B or R134A refrigerant, and so on. In various particular embodiments, the refrigerant fluid comprises R32 refrigerant. An oil such as a lubricant oil may also optionally provided together with the refrigerant fluid within the refrigeration circuit.

The compression device may be any suitable device for raising the pressure of the refrigerant fluid, and hence may be a compressor. The compression device may have an inlet connected to a fluid pathway from the heat absorbing heat exchanger and an outlet connected to a fluid pathway to the heat rejecting heat exchanger.

The heat rejection heat exchanger may be a condenser. The heat rejection heat exchanger may comprise a micro channel heat exchanger (MCHE). The heat rejection heat exchanger may have an inlet connected to a fluid pathway from the compression device and an outlet connected to a fluid pathway to the expansion device.

The expansion device may be any suitable device for reducing the pressure of the refrigerant fluid, such as an expansion valve, or a separator with an expansion function. The expansion device may be arranged to provide a controllable degree of expansion, such as via use of a valve with a controllable degree of opening. The expansion valve may be an electronic expansion valve. The degree of opening of the expansion valve may be controlled by the controller. The expansion device may have an inlet connected to a fluid pathway from the heat rejecting heat exchanger and an outlet connected to a fluid pathway to the heat absorbing heat exchanger.

The heat absorbing heat exchanger may be an evaporator. The heat absorbing heat exchanger may be a brazed plate heat exchange (BPHE). The heat absorbing heat exchanger may have an inlet connected to a fluid pathway from the expansion device and an outlet connected to a fluid pathway to the compression device.

The one or more sensors may comprise one or more pressure sensors configured to measure a pressure associated with the heat rejecting heat exchanger, such as a pressure of the refrigeration fluid. The one or more sensors may be configured to measure a pressure of the refrigeration fluid within the heat rejecting heat exchanger or a pressure indicative of the pressure of the refrigeration fluid within the heat rejecting heat exchanger. The one or more sensors may comprise a pressure sensor located adjacent the inlet to the heat rejecting heat exchanger, i.e. between the compression device and the heat rejecting heat exchanger.

The one or more sensors may be configured to (in operation) measure the pressure (of the refrigeration fluid) substantially continuously or periodically. The system may be configured such that information indicative of the pressure measured by the one or more sensors is sent to (and received by) the controller.

The controller may be configured to calculate (to predict) the predicted pressure. In operation, the controller may be configured to calculate (to predict) the predicted pressure substantially continuously or periodically.

The predicted pressure may (approximately) be a maximum pressure of the refrigeration fluid associated with (e.g. within) the heat rejecting heat exchanger that would be possible in the absence of slug flow (or similar instabilities).

It will be appreciated that this pressure may vary, e.g. depending on the particular operating conditions of the refrigeration system. Thus, the controller may be configured to calculate the predicted pressure using one or more measured and/or determined parameters of the refrigeration system (other than the measured pressure).

Correspondingly, the system may be configured to measure and/or determine one or more or each of the one or more parameters. In operation, the system may be configured to measure and/or determine one or more or each of the one or more parameters substantially continuously or periodically.

The one or more parameters may comprise: (i) an outdoor air temperature; (ii) a temperature associated with the heat absorbing heat exchanger, such as the temperature of the heat absorbing heat exchanger; (iii) a capacity (tonnage) of the compression device; (iv) an area associated with the heat rejecting heat exchanger, such as the area of the heat rejecting heat exchanger; (v) a pressure ratio associated with the refrigeration circuit; and/or (vi) a fan speed. The Applicants have recognized that a suitable predicted pressure can be calculated using these parameters.

One or more or each of these parameters may be used to calculate the predicted pressure. At least one or more or each of these parameters may be measured and/or determined (in real-time) by the refrigeration system. However, one or more of these parameters may be constant (in which case the system need not measure or determine that parameter(s), but may instead use an appropriate constant value, e.g. which may be stored in a memory).

The controller is configured to compare the measured pressure to the predicted pressure. In operation, the controller may be configured to compare the measured pressure to the predicted pressure substantially continuously or periodically.

The controller is configured to control the expansion device on the basis of the comparison. The controller may be configured to control the degree of expansion of the expansion device on the basis of the comparison. The controller may be configured to control the degree of opening of the expansion valve of the expansion device on the basis of the comparison.

When the measured pressure is less than the predicted pressure, the controller may control the expansion device so as to maintain a desired refrigerant flow rate through the refrigeration circuit. This may comprise the controller controlling the expansion valve so as to maintain its degree of opening at a first value.

When the measured pressure is greater than or equal to the predicted pressure, the controller may control the expansion device so as to temporarily increase the refrigerant flow rate through the refrigeration circuit. This may comprise temporarily increasing the degree of opening of the expansion valve. The degree of opening of the expansion valve may be increased by a factor of, for example around 2 or 3 times, for some relatively short time period, such as for a time period of a few seconds or few tens of seconds.

Increasing the degree of opening of the expansion device in this manner will have the effect of increasing the flow rate of refrigerant through the refrigeration circuit, thereby flushing refrigerant from the heat rejecting heat exchanger and eliminating or reducing the slug follow phenomenon. By only temporarily increasing the degree of opening of the expansion device for some relatively short time period, this can be done is a manner which does not significantly affect the functioning of the refrigeration system, i.e. without significantly affecting the refrigeration (or heating) provided by the refrigeration system.

Thus, when the measured pressure is greater than or equal to the predicted pressure, the controller may control the expansion valve so as temporarily increase its degree of opening from the first value to a second value, where the second value is greater than the first value. The controller may control the expansion valve so as maintain its degree of opening at the second value for a time period, and then (after the time period) may control the expansion valve so as return its degree of opening to the first value (or to some other desired value).

In various embodiments, the ratio of the second value to the first value may be, for example, (i) $\geq 1.5$; (ii) $\geq 2$; (iii) $\geq 2.5$; (iv) $\geq 3$; (v) $\geq 3.5$; or (vi) $\geq 4$. In various embodiments, the time period may be, for example, (i) 1-10 s; (ii) 10-20 s; (iii) 20-30 s; (iv) 30-40 s; (v) 40-50 s; (vi) 50-60 s; or (vii) >60 s.

The present invention also provides methods of operating refrigeration systems that include a refrigeration circuit comprising a compression device, a heat rejecting heat exchanger, an expansion device, and a heat absorbing heat exchanger. The methods include measuring a pressure associated with the heat rejecting heat exchanger, comparing the measured pressure to a predicted pressure, and controlling the expansion device on the basis of the comparison.

The method may comprise passing refrigerant fluid from the heat absorbing heat exchanger to the compressor, passing refrigerant fluid from the compressor to the heat rejecting heat exchanger, passing refrigerant fluid from the heat rejecting heat exchanger to the expansion device, and/or passing refrigerant fluid from the expansion device to the heat absorbing heat exchanger. The method may comprise the compression device raising the pressure of the refrigerant fluid, and/or the expansion device reducing the pressure of the refrigerant fluid.

Measuring the pressure associated with the heat rejecting heat exchanger may comprise measuring a pressure of the refrigeration fluid within the heat rejecting heat exchanger or a pressure indicative of the pressure of the refrigeration fluid within the heat rejecting heat exchanger.

Measuring the pressure associated with the heat rejecting heat exchanger may comprise substantially continuously and/or periodically measuring the pressure associated with the heat rejecting heat exchanger.

The method may comprise calculating the predicted pressure. This may be done substantially continuously and/or periodically. The predicted pressure may be calculated using one or more measured and/or determined parameters of the refrigeration system (other than the measured pressure). The method may comprise continuously and/or periodically measuring the one or more parameters.

The one or more parameters may comprise: (i) an outdoor air temperature; (ii) a temperature associated with the heat absorbing heat exchanger, such as the temperature of the heat absorbing heat exchanger; (iii) a capacity (tonnage) of the compression device; (iv) an area associated with the heat rejecting heat exchanger, such as the area of the heat rejecting heat exchanger; (v) a pressure ratio associated with the refrigeration circuit; and/or (vi) a fan speed. The Applicants have recognized that a suitable predicted pressure can be calculated using these parameters.

Comparing the measured pressure to the predicted pressure may comprise comparing the measured pressure to the predicted pressure substantially continuously and/or periodically.

The expansion device may comprise a valve with a controllable degree of opening, and the method may comprise controlling the degree of opening of the expansion valve on the basis of the comparison.

The method may comprise controlling the expansion device so as to maintain a desired refrigerant flow rate through the refrigeration circuit when the measured pressure is less than the predicted pressure. This may comprise controlling the expansion valve so as to maintain its degree of opening at a first value.

The method may comprise controlling the expansion device so as to temporarily increase the refrigerant flow rate through the refrigeration circuit when the measured pressure is greater than or equal to the predicted pressure. This may comprise temporarily increasing the degree of opening of the expansion valve from the first value to a second value when the measured pressure is greater than or equal to the predicted pressure, where the second value is greater than the first value. The method may comprise controlling the expansion valve so as maintain its degree of opening at the second value for a time period, and then (after the time period) controlling the expansion valve so as return its degree of opening to the first value (or to some other desired value).

The ratio of the second value to the first value may be around (i) ≥1.5; (ii) ≥2; (iii) ≥2.5; (iv) ≥3; (v) ≥3.5; or (vi) ≥4. The first time period may have a duration of around (i) 1-10 s; (ii) 10-20 s; (iii) 20-30 s; (iv) 30-40 s; (v) 40-50 s; (vi) 50-60 s; or (vii) >60 s.

The refrigeration system may be used to satisfy a cooling load. In this case, cooling of the refrigerant fluid may be done by the heat rejecting heat exchanger rejecting heat to the atmosphere, and heating of the refrigerant fluid may be done by the heat absorbing heat exchanger absorbing heat from an object to be cooled, such as a refrigerated space for low temperature storage, or an interior of a building.

Alternatively, the refrigeration system can be used as a heat pump to satisfy a heat demand. In this case, the heat absorbing heat exchanger may be used to absorb heat from a low temperature source, with the refrigeration circuit then rejecting heat to a higher temperature object that is to be heated, such as a heated space or the interior of a building.

As seen in FIG. 1, a refrigeration system includes a compression device 12, a heat rejecting heat exchanger 14, an expansion device 18 and a heat absorbing heat exchanger 16 that together form a refrigeration circuit. The refrigeration circuit contains a refrigerant fluid and circulation of the refrigerant fluid via the compression device 12 enables the refrigeration system to utilize a refrigeration cycle (or heat pump cycle) to satisfy a cooling (or heating) load.

In this example, the compression device 12 is a compressor 12 for compression of gaseous refrigerant fluid, the heat rejecting heat exchanger 14 is a condenser for at least partially condensing the refrigerant fluid, the expansion device 18 is an expansion valve for expanding the refrigerant fluid, and the heat absorbing heat exchanger 16 is an evaporator for at least partially evaporating the refrigerant fluid. The refrigeration system may be arranged so that the fluid is fully condensed at the condenser 14, and fully evaporated at the evaporator 16.

As also seen in FIG. 1, the system also includes a controller 20 which may receive various inputs from the refrigeration system, and which may be configured to control various parts of the refrigeration system. The controller may comprise suitable control circuitry that is configured to cause the refrigeration system to operate in the manner of the various embodiments described herein. The controller may comprise suitable processing circuitry configured to perform any one or more or all of the necessary processing operations in respect of the various embodiments described herein. In various embodiments, the controller may comprise a suitable computing device (computer), a microprocessor system, a programmable FPGA (field programmable gate array), and the like.

As shown in FIG. 1, the controller 20 may receive as an input a pressure measurement from a pressure sensor 22 arranged at the inlet to the heat rejecting heat exchanger 14. The controller may be configured to receive other inputs from the refrigeration system (not shown in FIG. 1), as will be described further below.

The controller may also be configured to control the expansion device 18 by controlling a degree of opening of the expansion valve. The controller may be configured to control other elements of the refrigeration system (not shown in FIG. 1).

The heat rejecting heat exchanger 14 may comprise a micro-channel heat exchanger (MCHE). Typically, these heat exchangers have been operated with R410A or R134a refrigerant.

With the introduction of R32 refrigerant, the Applicant has recognized that a liquid slug (or "slug flow") phenomenon of refrigerant fluid within the heat rejecting heat exchanger 14 can be responsible for destabilizing the refrigeration system, thereby reducing the conditions under which the system can reliably operate, and reducing its efficiency. This is thought to be due to the new refrigerant/oil mixture having a lower refrigerant density, but a higher oil viscosity. A similar phenomenon may also occur when other high pressure refrigerants (such as R32, R410A, R454B etc.) are used in together with a micro-channel heat exchanger (MCHE).

Figure 2:
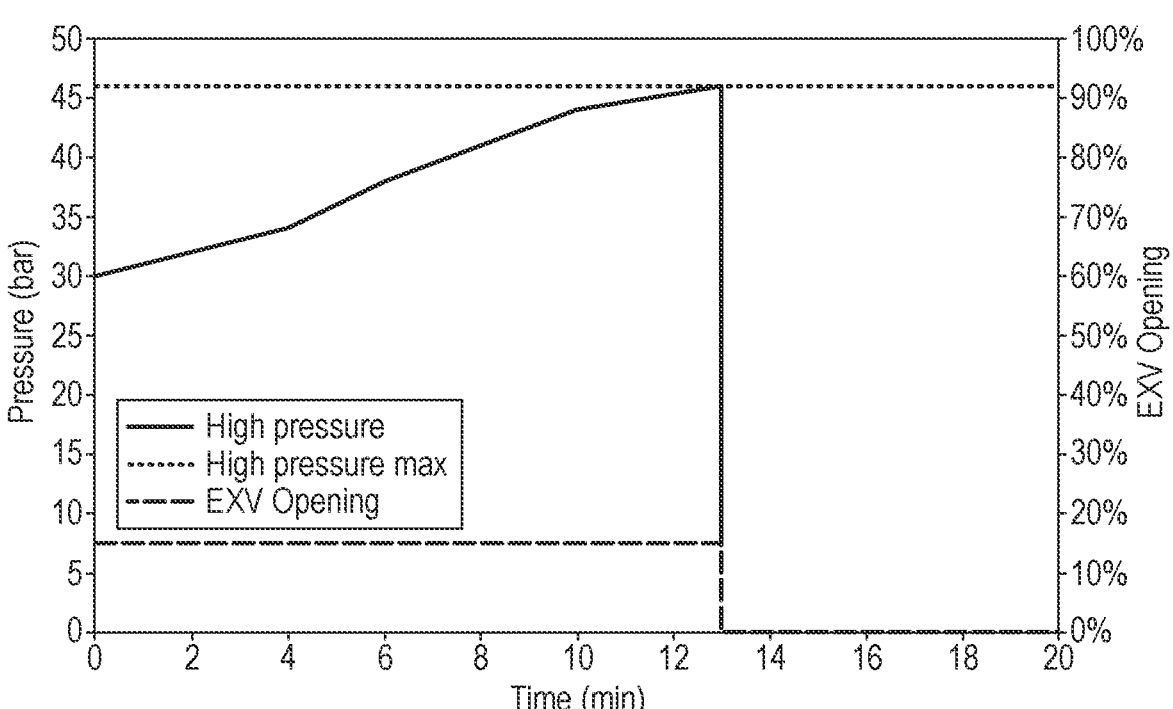
FIG. 2 is a graph showing a measured pressure as a function of time for a refrigeration system operating without the techniques of various embodiments.

FIG. 2 is a graph showing pressure measured by the sensor 22 as a function of time in a refrigeration system operated without controlling the expansion device 18 on the basis of the comparison in the manner of various embodiments. FIG. 2 also shows the degree of opening of the expansion valve 18 as a function of time.

In this example, the system is initially operated in a "normal" state, whereby the expansion valve 18 is operated with a desired degree of opening, in this example of around 7%. However, in this example, slug flow has occurred within the heat rejecting heat exchanger 14, and so the pressure measured by the sensor 22 rises with time until a maximum permitted operating pressure is reached. When the maximum permitted operating pressure is reached, the controller 20 causes the refrigeration system to shut down by closing the expansion device 18 completely.

The disadvantageously causes disruption to the user, as the system ceases to operate due to the controller 20 shutting down the system when the system is operating at a dangerously high pressure.

In accordance with various embodiments, the controller 20 is provided with additional logic in order to eliminate or reduce problems associated with slug flow.

In particular, the controller 20 may be configured to calculate a maximum pressure value that is expected to be measured by the sensor 22 absent the slug flow phenomenon. This calculation may be done using operating parameters of the refrigeration system (other than the measured pressure) that can be readily measured and/or determined. A measured pressure reaching or exceeding this predicted pressure can be indicative of the presence of slug flow (or similar instabilities).

In this regard, the Applicant has recognized that suitable predicted maximum pressure value can be determined based on the outdoor air temperature, evaporator temperature, compressor tonnage, heat exchanger area, pressure ratio and fan rotation speed. In particular, a predicted pressure value can be determined using the equation:

$$SCT_{theo} =$$
$$a \times \text{Tons per coild} + b \times OAT + c \times SST + d \times \frac{P_{dis}}{P_{suc}} + e \times rpm_{fan} + d$$

In this equation, the "Tons per coil" may be the number of compressors switched on divided by the number of coils of the circuit; "OAT" may be the outdoor air temperature (which may be measured by a temperature sensor); "SST" may be the saturated suction temperature of the circuit (which may be measured by a pressure sensor, for example on the suction pipe); "$P_{dis}/P_{suc}$" may be the ratio of the discharge pressure and suction pressure of the circuit (which may be measured by pressure sensors, e.g. on the discharge and suction pipe); and "$Rpm_{fan}$" may be the fan frequency of the circuit (which may be determined from software). It should be noted that all of these parameters can be measured or determined using sensors that may already be present within the refrigeration system, so that no additional sensors may be needed.

The various coefficients a, b, c, d and e may be set as desired for the particular refrigeration system in question, e.g. depending on a calibration and/or changing operating conditions. For example, they may be set so as to take into account contamination of the coil(s), etc.

The controller 20 may be configured to compare the pressure measured by the sensor 22 to the calculated predicted pressure value.

If the pressure value measured by the sensor 22 is greater than the calculated predicted value, the controller 20 may control the expansion valve 18 so as to increase its degree of opening, so as to momentarily increase the mass flow rate of refrigerant through the refrigeration circuit, thereby reducing the pressure within the heat rejecting heat exchanger 14 and stopping or reducing slug flow within the heat rejecting heat exchanger 14.

The controller 20 may control the expansion valve 18 so as to increase its degree of opening for a sufficiently short period of time and at a sufficiently low degree of opening such that the effect of the pressure wave is insignificant on the operation of the refrigeration system, meaning it is not detectable by the user.

Figure 3:
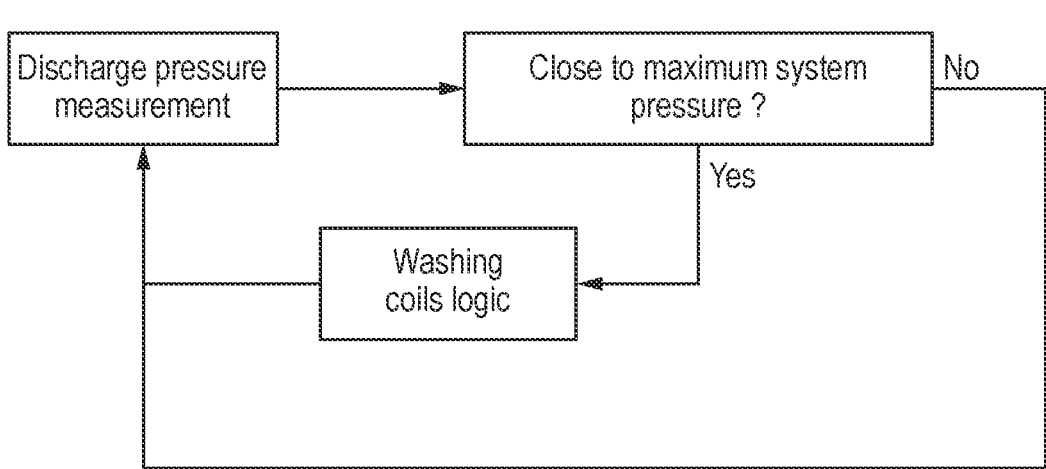
FIG. 3 is a flow diagram showing a method of operating a refrigeration system in accordance with various embodiments.

FIG. 3 is a flow diagram illustrating the controller's 20 programmed logic for controlling the expansion valve 18.

As shown in FIG. 3, the controller receives information indicative of the pressure ("discharge pressure") measured by the sensor 22. The pressure measurement is compared to a maximum system pressure, which is calculated using the equation described above. The controller 20 may be configured to receive readings from the sensor 22 continuously or periodically, to calculate the maximum system pressure continuously or periodically, and to compare the measured value to the maximum system pressure continuously or periodically.

If the pressure measurement is close to the maximum system pressure, the controller 20 activates its "washing coils logic" by opening the expansion valve 18 for a specific amount of time and at a specific degree of opening, thereby eliminating any slug flow from the system.

Figure 4:
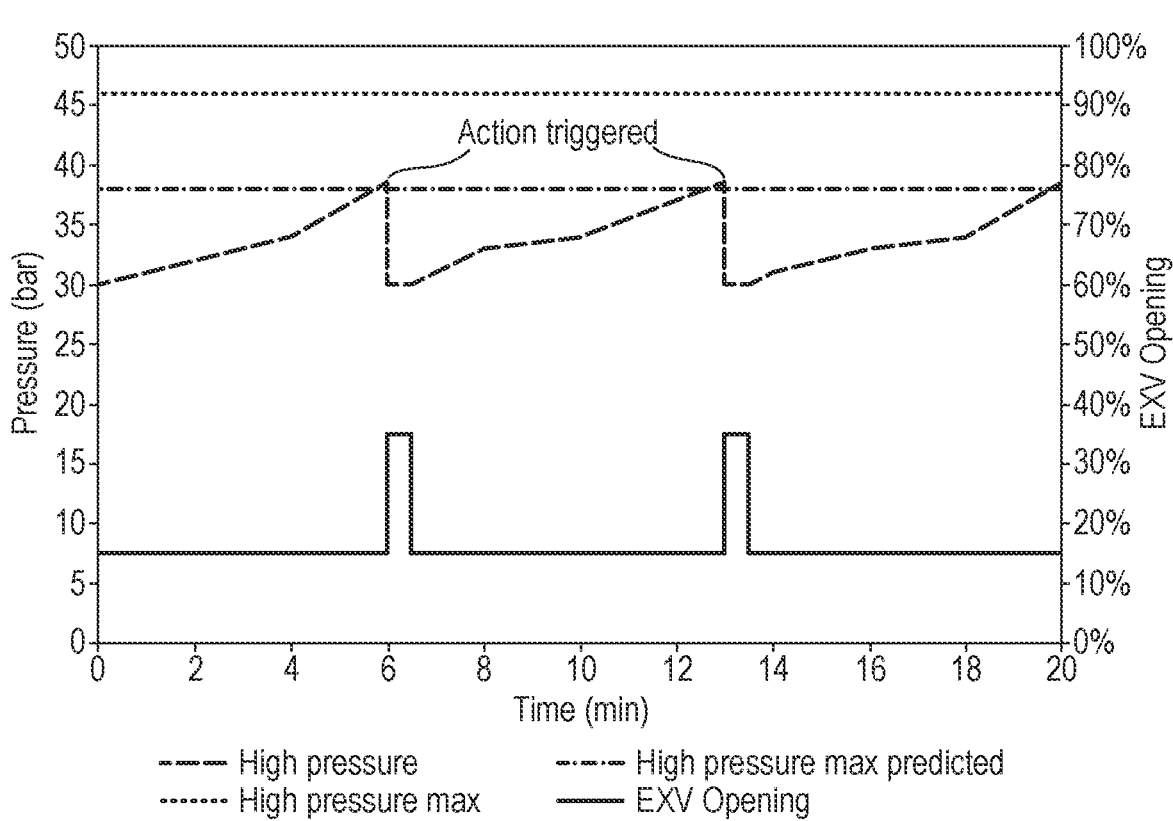
FIG. 4 is a graph showing a measured pressure as a function of time for a refrigeration system operating in accordance with various embodiments.

FIG. 4 is a graph showing the pressure measured by the sensor 22 as a function of time in a refrigeration system operated when controlling the expansion device 18 on the basis of the comparison in the manner of various embodiments.

In this example, the system is initially operated in a "normal" state, whereby the expansion valve 18 is operated with a desired degree of opening, in this example of around 7%. However, in this example, slug flow has occurred within the heat rejecting heat exchanger 14, and so the pressure measured by the sensor 22 rises with time.

However, at the same time the system continuously calculates a maximum pressure in the manner described above. Once the measured pressure reaches or exceeds the calculated maximum pressure, the degree of opening of the expansion valve 18 is increased for a short amount of time (a few seconds or tens of seconds) and at a specific opening percentage (in this example around 18%), thereby reducing the pressure of the refrigerant fluid within the heat rejecting heat exchanger 14, and eliminating and/or removing any slug flow.

This process is repeated continuously during the operation of the refrigeration system, so that the pressure does not ever reach the maximum permitted operating pressure.

This advantageously results in continuous operation of the refrigeration system, without disruption to the user. This can also enlarge the operating envelope of the refrigeration system and increase its efficiency.

For example, under some specific conditions, a low proportion of liquid slugging can provide a higher efficiency by producing additional sub-cooling. Efficiency gains at low load condition are estimated at up to 5%.

It will be appreciated that various embodiments provide an algorithm that can detect a slug flow phenomenon and can act to ensure stable operation at various possible operating conditions. The pressure of the heat exchanger 14 is continuously monitored, and a theoretical coil pressure is continuously evaluated.

When the pressure of the heat exchanger 14 is above the theoretical coil pressure, a washing coil logic is activated. The washing coil logic involves opening the expansion device 18 for a specific time duration and opening position in order to wash the coils of the heat exchanger 14 by flushing the liquid mixture for a few seconds, thereby significantly increasing the refrigerant flow.

Various embodiments advantageously provide more stable operation of the system without any visible effects on the refrigeration provided, broaden the operating envelop of the system, and improve its efficiency.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description but is only limited by the scope of the appended claims.

What is claimed is:

1. A refrigeration system comprising:
   a refrigeration circuit comprising a compression device, a heat rejecting heat exchanger, an expansion device, and a heat absorbing heat exchanger;
   one or more sensors configured to measure a pressure associated with the heat rejecting heat exchanger; and
   a controller configured to compare the pressure measured by the one or more sensors to a predicted pressure, and to control the expansion device on the basis of the comparison;
   wherein the comparison is repeated during operation of the refrigeration system;
   wherein the expansion device comprises an expansion valve, and wherein the controller is configured to control a degree of opening of the expansion valve whilst the expansion valve is open, on the basis of the comparison.

2. A refrigeration system as claimed in claim 1, wherein the controller is configured to continuously compare the measured pressure to the predicted pressure.

3. A refrigeration system as claimed in claim 1, wherein the controller is configured to periodically compare the measured pressure to the predicted pressure.

4. A refrigeration system as claimed in claim 1, wherein the controller is configured to continuously calculate the predicted pressure using one or more measured parameters.

5. A refrigeration system as claimed in claim 4, wherein the one or more measured parameters comprise at least one of (i) an outdoor air temperature; (ii) a temperature associated with the heat absorbing heat exchanger; (iii) a capacity of the compression device; (iv) an area associated with the heat rejecting heat exchanger; (v) a pressure ratio associated with the refrigeration circuit; and (vi) a fan speed associated with the refrigeration circuit.

6. A refrigeration system as claimed in claim 1, wherein the controller is configured to periodically calculate the predicted pressure using one or more measured parameters.

7. A refrigeration system as claimed in claim 6, wherein the one or more measured parameters comprise at least one of (i) an outdoor air temperature; (ii) a temperature associated with the heat absorbing heat exchanger; (iii) a capacity of the compression device; (iv) an area associated with the heat rejecting heat exchanger; (v) a pressure ratio associated with the refrigeration circuit; and (vi) a fan speed associated with the refrigeration circuit.

8. A refrigeration system as claimed in claim 1, wherein the controller is configured to control the expansion device on the basis of the comparison by temporarily increasing the degree of opening of the expansion valve when the measured pressure is greater than or equal to the predicted pressure.

9. A refrigeration system as claimed in claim 8, wherein the controller is configured to temporarily increase the degree of opening of the expansion valve by a factor of around (i) $\geq 1.5$; (ii) $\geq 2$; (iii) $\geq 2.5$; (iv) $\geq 3$; (v) $\geq 3.5$; or (vi) $\geq 4$.

10. A refrigeration system as claimed in claim 8, wherein the controller is configured to temporarily increase the degree of opening of the expansion valve for a time period of around (i) 1-10 s; (ii) 10-20 s; (iii) 20-30 s; (iv) 30-40 s; (v) 40-50 s; (vi) 50-60 s; or (vii) >60 s.

11. A method of operating a refrigeration system that comprises a refrigeration circuit comprising a compression device, a heat rejecting heat exchanger, an expansion device, and a heat absorbing heat exchanger, the method comprising:
   measuring a pressure associated with the heat rejecting heat exchanger;
   comparing the measured pressure to a predicted pressure;
   controlling the expansion device on the basis of the comparison; and
   repeating the comparison during operation of the refrigeration system;
   wherein the expansion device comprises an expansion valve, and wherein controlling the expansion device on the basis of the comparison comprises temporarily increasing a degree of opening of the expansion valve whilst the expansion valve is open, when the measured pressure is greater than or equal to the predicted pressure.

12. A method as claimed in claim 11, further comprising at least one of continuously and periodically measuring the pressure.

13. A method as claimed in claim 11, further comprising at least one of continuously and periodically comparing the measured pressure to the predicted pressure.

14. A method as claimed in claim 11, further comprising:
   at least one of continuously and periodically measuring one or more parameters; and

at least one of continuously and periodically calculating the predicted pressure based on the one or more parameters.

15. A method as claimed in claim 11, wherein the expansion device comprises an expansion valve, and wherein controlling the expansion device on the basis of the comparison comprises temporarily increasing a degree of opening of the expansion valve when the measured pressure is greater than or equal to the predicted pressure.

16. A method as claimed in claim 15, wherein controlling the expansion device on the basis of the comparison comprises temporarily increasing the degree of opening of the expansion valve from a first value to a second value when the measured pressure is greater than or equal to the predicted pressure, wherein the ratio of the second value to the first value is around (i) $\geq 1.5$; (ii) $\geq 2$; (iii) $\geq 2.5$; (iv) $\geq 3$; (v) $\geq 3.5$; or (vi) $\geq 4$.

17. A method as claimed in claim 15, wherein controlling the expansion device on the basis of the comparison comprises temporarily increasing the degree of opening of the expansion valve for a time period of around (i) 1-10 s; (ii) 10-20 s; (iii) 20-30 s; (iv) 30-40 s; (v) 40-50 s; (vi) 50-60 s; or (vii) >60 s.

18. A refrigeration system as claimed in claim 1, wherein the predicted pressure is a maximum predicted pressure of a refrigerant fluid absent a slug flow phenomenon.

19. A refrigeration system as claimed in claim 1, wherein the controller is configured to compare the pressure measured by the one or more sensors to the predicted pressure continuously during operation of the refrigeration system.

* * * * *